(12) United States Patent
Chun et al.

(10) Patent No.: US 7,160,952 B2
(45) Date of Patent: Jan. 9, 2007

(54) PROCESS FOR PREPARING LINEAR BLOCK COPOLYMER

(75) Inventors: Moon-Seok Chun, Daejeon (KR); Jae-Cheol Cho, Daejeon (KR); Kyu-Seok Sim, Daejeon (KR); Choon-Hwa Lee, Yongin (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/234,521

(22) Filed: Sep. 23, 2005

(65) Prior Publication Data

US 2006/0217509 A1 Sep. 28, 2006

Related U.S. Application Data

(63) Continuation-in-part of application No. 10/250,851, filed as application No. PCT/KR02/02129 on Nov. 14, 2002, now abandoned.

(30) Foreign Application Priority Data

Nov. 14, 2001 (KR) ............................... 2001-70840

(51) Int. Cl.
 *C08F 297/04* (2006.01)
(52) U.S. Cl. ...................................... 525/314; 525/271
(58) Field of Classification Search ................ 525/271, 525/314
 See application file for complete search history.

(56) References Cited

U.S. PATENT DOCUMENTS

| 4,073,831 | A | 2/1978 | Tabana et al. | ............ 260/876 B |
|---|---|---|---|---|
| 4,075,285 | A | 2/1978 | Tabana et al. | ............ 260/876 B |
| 4,089,913 | A | 5/1978 | Miki et al. | ............... 260/880 B |
| 4,122,134 | A | 10/1978 | Miki et al. | ............... 260/880 B |
| 4,704,434 | A | 11/1987 | Kitchen et al. | ............. 525/250 |
| 4,704,435 | A | 11/1987 | Kitchen | ...................... 525/250 |
| 4,939,208 | A | 7/1990 | Lanza et al. | .................. 525/93 |
| 5,180,535 | A | 1/1993 | Yamaoka et al. | ...... 264/328.16 |
| 6,031,053 | A | 2/2000 | Knoll et al. | ................. 525/314 |
| 6,140,433 | A | 10/2000 | Zhang et al. | ................ 526/173 |
| 6,235,847 | B1 | 5/2001 | Hoshi et al. | ................. 525/314 |

FOREIGN PATENT DOCUMENTS

| CN | 1376179 | 10/2002 |
|---|---|---|
| JP | 62-91518 | 4/1987 |
| JP | S63-145314 A | 6/1988 |
| JP | 01254768 | 10/1989 |
| WO | 95/12644 | 5/1995 |

*Primary Examiner*—Fred Teskin
(74) *Attorney, Agent, or Firm*—Cantor Colburn LLP

(57) ABSTRACT

The present invention relates to a linear block copolymer and a process for preparing the same, particularly to a linear block copolymer and a process for preparing the same which can improve transmissivity of a block copolymer and remarkably lower a Haze value by introducing a vinyl aromatic hydrocarbon to conduct primary polymerization, simultaneously introducing a vinyl aromatic hydrocarbon and a conjugated diene monomer therein to conduct secondary polymerization, and introducing a vinyl aromatic hydrocarbon therein to conduct tertiary polymerization, thereby locating a conjugated diene/vinyl aromatic hydrocarbon copolymer block in a block copolymer.

9 Claims, No Drawings

PROCESS FOR PREPARING LINEAR BLOCK COPOLYMER

CROSS-REFERENCE TO RELATED APPLICATIONS

This is a continuation-in-part application of U.S. patent application Ser. No. 10/250,851, filed on Jul. 1, 2003, now abandoned in the U.S. Patent and Trademark Office, which was the National Stage of International Application No. PCT/KR02/02129, filed on Nov. 14, 2002, which claimed the benefit of Korean Patent Application No. 2001-0070840, filed Nov. 14, 2001, in the Korean Intellectual Property Office, the contents of which are incorporated by reference herein in their entirely.

BACKGROUND OF THE INVENTION (a) Field of the Invention

The present invention relates to a linear block copolymer and a process for preparing the same, and particularly to a linear block copolymer in which a conjugated diene/vinyl aromatic hydrocarbon copolymer block is located in a block copolymer and a process for preparing the same.

(b) Description of the Related Art

Vinyl aromatic hydrocarbon/conjugated diene block copolymers prepared using organolithium and hydrocarbon solvent differ in their microstructures according to a ratio of vinyl aromatic hydrocarbon and conjugated diene, and processing conditions and physical properties of resultant products also differ. Generally, a rubber phase block copolymer having vinyl aromatic hydrocarbon contents of 50% or less is prepared by sequentially polymerizing a vinyl aromatic hydrocarbon and a conjugated diene and then introducing a coupling reactant.

WO 95/12644 has disclosed using a halogenous silane compound as a coupling reactant, which can shorten polymerization time and obtain a copolymer having vinyl aromatic hydrocarbon polymer blocks of the same molecular weights, but a lithium compound produced in the coupling reaction as a by-product causes discoloration during processing. In order to prevent this, a vinyl aromatic hydrocarbon block and a conjugated diene block are sequentially prepared and then the vinyl aromatic hydrocarbon is polymerized again, thereby preparing a linear triblock copolymer.

A linear or star block copolymer having vinyl aromatic hydrocarbon contents of 60 to 80% has superior transparency and impact strength and thus is used for packaging containers, etc. The block copolymer is also used for compensating impact strength of general-purpose polystyrene, and it is preferable to use a block copolymer having vinyl aromatic hydrocarbon contents of 70 to 80% for improving impact strength of polystyrene and for maintaining transparency. Recently, a linear or star copolymer having vinyl aromatic hydrocarbon contents of 20 to 50% has been blended with general-purpose polystyrene. Particularly, because the linear vinyl aromatic hydrocarbon/conjugated diene block copolymer prepared by sequentially introducing monomers does not generate side reactions such as discoloration during the polymerization process, it is suitable for molded products requiring high transparency, and it has superior dispersibility when blended with other resins and thus is suitable for improving impact resistance of polystyrene and for maintaining transparency.

In addition, U.S. Pat. No. 6,140,433 has disclosed a block copolymer with polydispersity that can improve impact resistance of other resins by sequentially introducing monomers when preparing a vinyl aromatic hydrocarbon/conjugated diene block copolymer, by introducing an initiator twice and introducing a vinyl aromatic hydrocarbon/conjugated diene copolymer block. However, although this method can easily control physical properties and processibility of a product, it is required that an exact amount of initiator is introduced and that polymerization should proceed at a high temperature. Additionally, the copolymer may lower transparency of the product due to side reactions generated by conducting polymerization at a high temperature.

Accordingly, there is a need for a process that can improve transparency by introducing a vinyl aromatic hydrocarbon/conjugated diene copolymer block into a block copolymer, and that can polymerize at a comparatively low polymerization temperature by introducing an initiator once.

SUMMARY OF THE INVENTION

In order to solve these problems, it is an object of the present invention to provide a block copolymer having superior transparency by controlling molecular weights and locations of a vinyl aromatic hydrocarbon block, a conjugated diene block, and a conjugated diene/vinyl aromatic hydrocarbon copolymer block.

It is another object of the present invention to provide a process for preparing a block copolymer that can remarkably improve transparency by introducing a vinyl aromatic hydrocarbon/conjugated diene copolymer block into a block copolymer.

In order to achieve these objects, the present invention provides a linear block copolymer represented by the following Chemical Formula 1:

$$A_1\text{-}B_1\text{-}(B/A)\text{-}A_2\text{-}A_3, \qquad \text{[Chemical Formula 1]}$$

wherein $A_1$, $A_2$, and $A_3$ are independently vinyl aromatic hydrocarbon blocks having a weight average molecular weight of 100 to 100,000, $B_1$ is a conjugated diene block having a weight average molecular weight of 100 to 100,000, and (B/A) is a conjugated diene/vinyl aromatic hydrocarbon copolymer block having a weight average molecular weight of 100 to 100,000.

The present invention also provides a process for preparing a linear block copolymer comprising the steps of:

a) introducing a vinyl aromatic hydrocarbon in a reactor to polymerize until 99% or more of monomers are consumed;

b) simultaneously introducing a vinyl aromatic hydrocarbon and a conjugated diene monomer in the reactor of step a) to polymerize until at least 99% of monomers are consumed; and c) introducing a vinyl aromatic hydrocarbon in the reactor of step b) to polymerize until at least 99% of monomers are consumed.

DETAILED DESCRIPTION AND THE PREFERRED EMBODIMENTS

The present invention will now be explained in detail.

The present inventors, while studying a process for improving transparency of a block copolymer, sequentially introduced a vinyl aromatic hydrocarbon, a vinyl aromatic hydrocarbon and a conjugated diene monomer, and a vinyl aromatic hydrocarbon, to polymerize them in the presence of a hydrocarbon solvent and an organolithium compound, and they confirmed superior effects for improving transparency and transmissivity of the block copolymer and completed the present invention.

The present invention relates to a block copolymer represented by the following Chemical Formula 1 in which a vinyl aromatic hydrocarbon/conjugated diene copolymer block is introduced into a block copolymer by sequentially introducing a vinyl aromatic hydrocarbon, a vinyl aromatic hydrocarbon and a conjugated diene monomer, and a vinyl aromatic hydrocarbon, to polymerize them in the presence of an organolithium compound and a polymerization initiator.

     [Chemical Formula 1]

wherein $A_1$, $A_2$, and $A_3$ are independently vinyl aromatic hydrocarbon blocks having a weight average molecular weight of 100 to 100,000, $B_1$ is a conjugated diene block having a weight average molecular weight of 100 to 100,000, and (B/A) is a conjugated diene/vinyl aromatic hydrocarbon copolymer block having a weight average molecular weight of 100 to 100,000.

The ratio of the $A_1$ block and $(A_2+A_3)$ block of the copolymer is preferably 0.1 to 10, and the ratio of vinyl aromatic hydrocarbon/conjugated diene monomer in the block copolymer is preferably 25:75 to 50:50.

The block copolymer represented by the above Chemical Formula 1 of the present invention preferably has an average molecular weight of 400 to 400,000, and it may have a monodispersive or polydispersive molecular weight distribution.

The vinyl aromatic hydrocarbon used in the present invention includes styrene, α-methylstyrene, 2-methylstyrene, 4-methylstyrene, 4-propylstyrene, 1-vinylnaphthalene, 4-cyclohexylstyrene, 4-(p-methylphenyl)styrene, or 1-vinyl-5-hexylnaphthalene, etc., and styrene or methylstyrene is preferable.

As the conjugated diene monomer, 1,3-butadiene, 2,3-dimethyl-1,3-butadiene, piperylene, 3-butyl-1,3-octadiene, isoprene, or 2-phenyl-1,3-butadiene, etc. can be used alone or in combination, and preferably 1,3-butadiene or isoprene is used.

The organolithium compound plays a function as a polymerization initiator. As the organolithium compound, an alkyl lithium compound can be used, and particularly an alkyl lithium compound having a C3–10 alkyl group is preferable. Other organolithium compounds can be used in addition to the alkyl lithium compound.

As the organolithium compounds, methyl lithium, ethyl lithium, isopropyl lithium, n-butyl lithium, sec-butyl lithium, tert-butyl lithium, n-decyl lithium, tert-octyl lithium, phenyl lithium, 1-naphthyl lithium, n-eicosyl lithium, 4-butylphenyl lithium, 4-tollyl lithium, cyclohexyl lithium, 3,5-di-n-heptylcyclohexyl lithium, or 4-cylcopentyl lithium, etc. can be used, and n-butyl lithium or sec-butyl lithium is preferable.

As the hydrocarbon solvent, n-pentane, n-hexane, n-heptane, isooctane, cyclohexane, toluene, benzene, or xylene, etc. can be used, and other aromatic hydrocarbons or naphthalene hydrocarbons can be used. Particularly, n-hexane, cyclohexane or a mixed solution thereof is preferable.

In addition, a small amount of polar solvent can be added to the hydrocarbon solvent, and the polar solvent plays a function for controlling vinyl contents and improving polymerization speed when polymerizing a conjugated diene monomer. As the polar solvent, tetrahydrofuran, ethylether, or tetramethylethylenediamine, etc. can be used, and tetrahydrofuran is preferable.

The present invention also provides a process for preparing the above-mentioned linear block copolymer.

In order to prepare the vinyl aromatic hydrocarbon/conjugated diene polymer, monomers are introduced in a reactor containing an organolithium compound and a hydrocarbon solvent through three steps or more.

a) Introduction of Vinyl Aromatic Hydrocarbon

In a reactor containing a hydrocarbon solvent and an organolithium compound polymerization initiator, a vinyl aromatic hydrocarbon is introduced and polymerized until at least 99% of monomers are consumed. The structure of the produced active polymer is $A_1$.

b) Simultaneous Introduction of a Vinyl Aromatic Hydrocarbon and a Conjugated Diene Monomer In the reactor of the step a), the vinyl aromatic hydrocarbon and conjugated diene monomer are simultaneously introduced and polymerized until at least 99% of monomers are consumed. In this step for copolymerizing the vinyl aromatic hydrocarbon and conjugated diene monomer in the presence of the hydrocarbon solvent, the conjugated diene is initially consumed to form the conjugated diene block first, and when most of the conjugated diene is consumed, the vinyl aromatic hydrocarbon begins to be consumed to sequentially form a conjugated diene/vinyl aromatic hydrocarbon copolymer block and a vinyl aromatic hydrocarbon block.

Therefore, the structure of the active polymer produced in the second step is $A_1$-$B_1$-(B/A)-$A_2$.

c) Introduction of Vinyl Aromatic Hydrocarbon

In the reactor of the step b), a vinyl aromatic hydrocarbon is introduced and polymerized until at least 99% of monomers are consumed. The structure of the produced active polymer is $A_1$-$B_1$-(B/A)-$A_2$-$A_3$. When the polymerization is completed, water or alcohol is added to the reactor to arrest activity of the active polymer.

The polymerization is preferably conducted at a temperature range of −50 to 150° C. and under a pressure range sufficient for maintaining a reactant liquid phase.

The block copolymer prepared according to the present invention has superior transparency, and it also has superior transparency when used as an impact reinforcing agent for other resins or molded products.

The present invention will be explained in more detail with reference to the following examples. However, these are to illustrate the present invention, and the present invention is not limited to them.

EXAMPLES

Example 1

A block copolymer having styrene weight contents of 40% and comprising a butadiene/styrene copolymer block was prepared as follows.

In a 20L reactor substituted with nitrogen, 9280 g of cyclohexane purified with hydrocarbon solvent and 300 g of styrene as a vinyl aromatic hydrocarbon were introduced and agitated, and when the temperature of the mixed solution became 65° C., 1.74 g of n-butyllithium were added as an organolithium compound to polymerize the styrene. 900 g of butadiene as a conjugated diene monomer and 150 g of styrene as a vinyl aromatic hydrocarbon were introduced therein, and polymerization was conducted until monomers were completely consumed. 150 g of styrene as a vinyl aromatic hydrocarbon were introduced and polymerization was conducted until monomers were completely consumed, and 0.5 g of water was added to the reactor to terminate activity of the active copolymer. 7.5 g of Irganox1076 and 15.0 g of TNPP (tris(nonylphenyl)phosphite) were added thereto as an antioxidant to prepare a block copolymer. The weight average molecular weight of the prepared block copolymer was 68,000 g/mol, and the block styrene contents were 36 wt %.

Comparative Example 1

A block copolymer having styrene weight contents of 40% was prepared as follows.

In a 20 L reactor substituted with nitrogen, 9280 g of cyclohexane purified with hydrocarbon solvent and 300 g of styrene as a vinyl aromatic hydrocarbon were introduced and agitated, and when the temperature of the mixed solution became 65° C., 1.74 g of n-butyl lithium were introduced as an organolithium compound to polymerize the styrene. 900 g of butadiene were introduced therein as a conjugated diene monomer to polymerize until the butadiene was completely consumed. 300 g of styrene were introduced therein as a vinyl aromatic hydrocarbon to polymerize until the styrene was completely consumed, and 0.5 g of water was added to the reactor to terminate activity of the active copolymer. 7.5 g of Irganox1076 and 15.0 g of TNPP were added to the polymerization solution as an antioxidant to prepare a block copolymer. The weight average molecular weight of the prepared block copolymer was 69,000 g/mol, and the block styrene contents were 39 wt %.

The block copolymers prepared in Example 1 and Comparative Example 1 were made into samples of 2 mm thickness after removing the solvent, and transmissivity and Haze value were measured and are shown in Table 1.

TABLE 1

| Transparency | Example 1 | Comparative Example 1 |
|---|---|---|
| Transmissivity | 89.6 | 89.6 |
| Haze value | 5.6 | 10.3 |

As seen from Table 1, the block copolymer of Example 1 of the present invention in which vinyl aromatic hydrocarbon/conjugated diene copolymer block was introduced into a block copolymer has a low Haze value and thus superior transparency compared to that of Comparative Example 1.

As explained, the block copolymer of the present invention can remarkably improve transparency by introducing a vinyl aromatic hydrocarbon/conjugated diene copolymer block into a block copolymer, it can be polymerized at a comparatively low temperature by introducing an initiator once, and it has superior transparency when used for an impact reinforcing agent for other resins or molded products.

What is claimed is:
1. A linear block copolymer comprising:
a structure represented by the following Chemical Formula 1:

$A_1\text{-}B_1\text{-}(B/A)\text{-}A_2\text{-}A_3$, wherein
$A_1$, $A_2$, and $A_3$ are each independently a vinyl aromatic hydrocarbon block, having a weight average molecular weight of 100 to 100,000;

$B_1$ is a conjugated diene monomer block, having a weight average molecular weight of 100 to 100,000; and
(B/A) is a conjugated diene monomer/vinyl aromatic hydrocarbon copolymer block, having a weight average molecular weight of 100 to 100,000;
wherein a weight ratio of the vinyl aromatic hydrocarbon/conjugated diene monomer in the linear block copolymer is 25:75 to 50:50.

2. The linear block copolymer according to claim 1, wherein the ratio of $A_1$ block and $(A_2+A_3)$ block of the copolymer is 0.1 to 10.

3. The linear block copolymer according to claim 1, wherein the vinyl aromatic hydrocarbon is selected from a group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, and a mixture thereof.

4. The linear block copolymer according to claim 1, wherein the conjugated diene monomer is selected from a group consisting of 1,3-butadiene, 2,3-dimethyl-1,3-butadiene, piperylene, 3-butyl-1,3-octadiene, isoprene, 2-phenyl-1,3-butadiene, and a mixture thereof.

5. A process for preparing a linear block copolymer represented by the following Chemical Formula 1: $A_1\text{-}B_1\text{-}(B/A)\text{-}A_2\text{-}A_3$, wherein $A_1$, $A_2$, and $A_3$ are each independently a vinyl aromatic hydrocarbon block having a weight average molecular weights of 100 to 100,000; $B_1$ is a conjugated diene monomer block having a weight average molecular weight of 100 to 100,000; and (B/A) is a conjugated diene monomer/vinyl aromatic hydrocarbon copolymer block having a weight average molecular weight of 100 to 100,000, wherein a weight ratio of the vinyl aromatic hydrocarbon to the conjugated diene monomer in the linear block copolymer is 25:75 to 50:50, comprising:
introducing a vinyl aromatic hydrocarbon into a reactor to polymerize until at least 99% of monomers are consumed;
simultaneously introducing a vinyl aromatic hydrocarbon and a conjugated diene into the reactor to polymerize until at least 99% of monomers are consumed; and
introducing a vinyl aromatic hydrocarbon into the reactor to polymerize until at least 99% of monomers are consumed.

6. The process according to claim 5, wherein the polymerizing is conducted at a temperature range of −50 to 150° C.

7. The process according to claim 5, wherein the vinyl aromatic hydrocarbon is styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, or a combination comprising at least one of the foregoing.

8. The process according to claim 5, wherein the conjugated diene monomer is 1,3-butadiene, 2,3-dimethyl-1,3-butadiene, piperylene, 3-butyl-1,3-octadiene, isoprene, 2-phenyl-1,3-butadiene, or a combination comprising at least one of the foregoing.

9. The process according to claim 5, wherein polymerizing occurs in the presence of methyl lithium, ethyl lithium, isopropyl lithium, n-butyl lithium, sec-butyl lithium, tert-butyl lithium, n-decyl lithium, tert-octyl lithium, phenyl lithium, 1-naphthyl lithium, n-eicosyl lithium, 4-butylphenyl lithium, 4-tollyl lithium, cyclohexyl lithium, 3,5-di-n-heptylcyclohexyl lithium, 4-cyclopentyl lithium, or a combination comprising at least one of the foregoing.